June 11, 1935. W. A. GRIESHABER 2,004,892

PNEUMATIC TIRE

Filed Sept. 11, 1934

W. A. Grieshaber INVENTOR

BY Victor J. Evans & Co.

ATTORNEY

WITNESS: J. T. L. Wright

Patented June 11, 1935

2,004,892

UNITED STATES PATENT OFFICE 2,004,892

PNEUMATIC TIRE

William A. Grieshaber, Riverside, Calif.

Application September 11, 1934, Serial No. 743,596

1 Claim. (Cl. 152—22)

The invention relates to a pneumatic tire and more especially to a double pneumatic tire or double air chambered tire.

The primary object of the invention is the provision of a tire of this character wherein by its construction, in event of a puncture, blow-out, or stone or glass cut, the said tire will still be serviceable to avoid its collapse, that is to say, should the outer shoe or casing be damaged resultant from the puncture, blow-out or cut, as the tire is double air chambered and both chambers are protected to assure double duty and longevity in the use of said tire.

Another object of the invention is the provision of a tire of this character, wherein the air tubes effecting the double air chambers within the tire are enveloped by casings of fabricated make-up, so that in event of the collapse of one tube, the other will serve to prevent the complete collapsing of the tire for further servicing thereof in its use, the tire in its entirety being of novel construction.

A further object of the invention is the provision of a tire of this character which is simple in its construction, thoroughly reliable and effective in its purposes, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing.

Similar reference characters indicate corresponding parts throughout the several views in the drawing.

Figure 1:
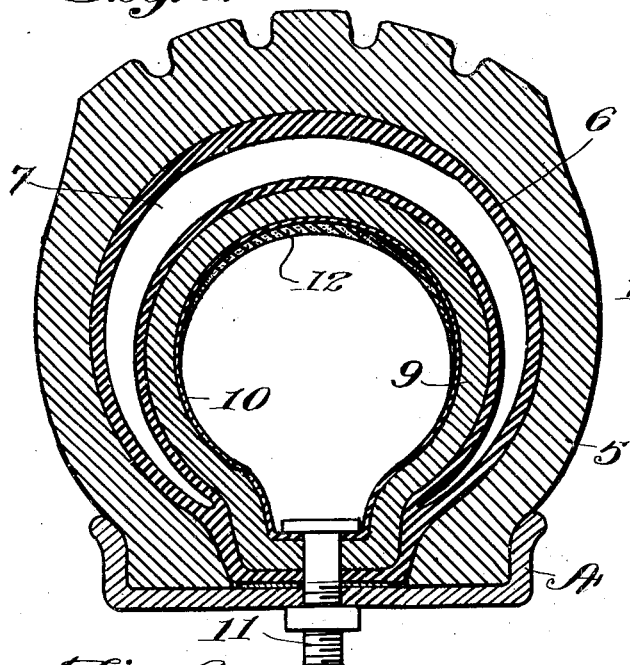
Figure 1 is a vertical transverse sectional view through a tire constructed in accordance with the invention, the same being shown mounted upon a rim.
Figure 3:
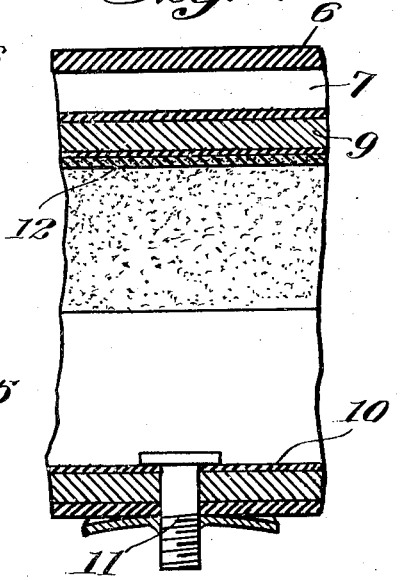
Figure 3 is a fragmentary vertical longitudinal sectional view showing the tire removed from the rim.
Figure 2:
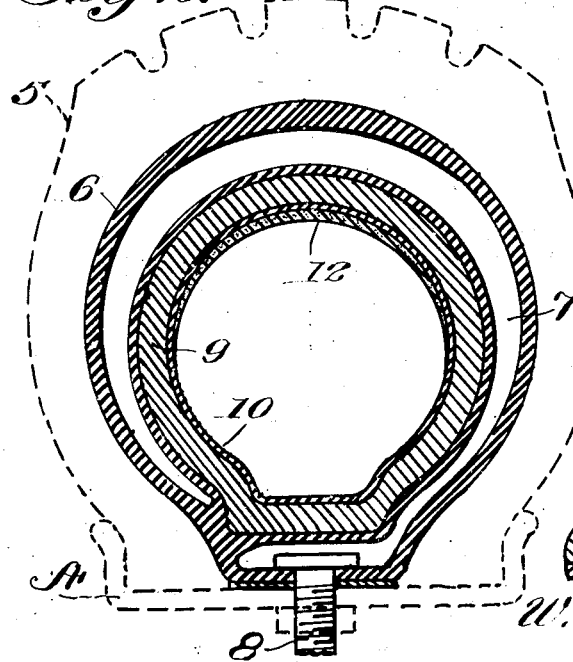
Figure 2 is a view similar to Figure 1, the section being taken at a different point transversely of the tire than that in Figure 1.
Figure 4:
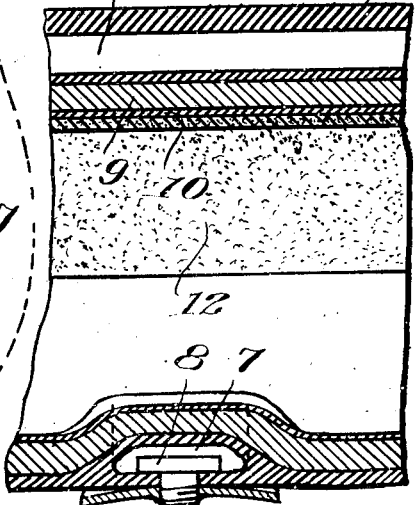
Figure 4 is a view similar to Figure 3, being taken at a different point, and showing the tire removed from the rim.

Referring to the drawing in detail, A designates generally a portion of a rim for a vehicle wheel and of the demountable kind for the carriage of the pneumatic tire embodying the present invention and hereinafter fully described. This pneumatic tire comprises an outer shoe or casing 5, it being preferably of the eight-ply fabric make-up and within this shoe or casing is a double wall inner tube 6, the double walls of which are spaced from each other throughout the sides and tread area of the shoe or casing 5 to provide an air chamber 7, the air under pressure being delivered thereto through a valved stem 8.

This inner tube 6 has its inner wall enveloping an inner casing 9, preferably of six-ply fabric, although the ply make-up may be varied according to the requirements of the load in the use of the tire. Within this inner casing is an inner tube 10 and air under pressure is introduced thereto through the valve stem 11, this inner tube 10 being the innermost air chamber, while the inner tube 6 effects the outermost air chamber within the tire.

It is desirable to have the stems 8 and 11 suitably marked, or, one white and the other red, so that the user of the tire will be able to distinguish the inner tubes 6 and 10 from each other when it is required to inflate or deflate the same.

It is desirable that these inner tubes 6 and 10 carry the same degree of pressure when the tire is blown up for use and in such use the said tire will have a double duty, because in event of puncture, blow-out, glass or stone cut, or otherwise breaking of the outer innermost tube 6, the tire will be prevented from collapsing and will have further service by the innermost inner tube 10 and the inner casing 9 enveloping the same.

It should be apparent that the casings 5 and 9 carry inner tubes, one being innermost with relation to the other, so that there is in effect a two-tire single unit tire of the pneumatic type and by such construction the said tire is rendered highly efficient in that the same will hold up when punctured and will prevent total collapse in case of a serious damage to the outer casing and its inner tube.

It, of course, will be apparent that by reason of the construction of the tire there are avoided accidents caused by a tire being suddenly deflated while the car is traveling at high speed. It is known that the car traveling at high speed is likely to turn over one or more times if by accident one of the tires suddenly deflates, resultant from blow-out or puncture, and by reason of the construction of the tire as before described such character of accident can be avoided.

The innermost wall of the inner tube 6 is made fast to the surface adjacent thereto of the inner casing 9, preferably by adhesive substance, and likewise the inner tube 10 is made fast to the adjacent face of the said inner casing 9, so that a unitary interior structure is obtained.

At the tread area of the inner tube 10 on the innermost surface thereof is affixed a gum rubber layer 12 which is for the purpose of preventing puncture of the inner air chamber by fitting so close around a nail or other penetrating object that might go entirely through the outer air chamber and penetrate to the inner chamber of the tire, as this gum rubber will close the hole or puncture to keep the air from escaping from the innermost air chamber of the tire.

As has been stated, the tire in its construction will avoid accidents caused by a tire being suddenly deflated while the automobile is traveling at high speed.

What is claimed is:

The combination of inner and outer inflatable tubes, the inner tube being interfitted with the outer tube at the inner periphery of the latter, a shoe between the tubes and extending entirely about said inner tube, and a casing separably fitted about the outer tube, the inner and outer tubes being formed with thickened portions at their outer peripheries.

WILLIAM A. GRIESHABER.